(12) United States Patent
Hayward et al.

(10) Patent No.: US 9,865,020 B1
(45) Date of Patent: *Jan. 9, 2018

(54) SYSTEMS AND METHODS FOR GENERATING VEHICLE INSURANCE POLICY DATA BASED ON EMPIRICAL VEHICLE RELATED DATA

(71) Applicant: STATE FARM MUTUAL AUTOMOBILE INSURANCE COMPANY, Bloomington, IL (US)

(72) Inventors: Gregory Hayward, Bloomington, IL (US); Scott T. Christensen, Salem, OR (US); Christopher E. Gay, Dallas, TX (US); Steven C. Cielocha, Bloomington, IL (US); Todd Binion, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,067

(22) Filed: Aug. 10, 2017

Related U.S. Application Data

(63) Continuation of application No. 14/203,349, filed on Mar. 10, 2014, now Pat. No. 9,779,458.

(51) Int. Cl.
*G06Q 40/08* (2012.01)
*B60C 1/00* (2006.01)
(Continued)

(52) U.S. Cl.
CPC .............. *G06Q 40/08* (2013.01); *B60C 1/00* (2013.01); *B60R 25/20* (2013.01);
(Continued)

(58) Field of Classification Search
CPC ...... G06F 21/31; G06F 21/32; G06F 11/3055; G07C 5/0808; G06Q 40/08; B60W 40/09;
(Continued)

(56) References Cited

U.S. PATENT DOCUMENTS 4,303,904 A   12/1981  Chasek
5,310,999 A    5/1994  Claus et al.
(Continued)

OTHER PUBLICATIONS

Mihailescu, An assessment Charter airline benefits for Port Elizabeth and the Eastern Cape, Chinese Business Review, pp. 34-45 (Feb. 2010).
(Continued)

*Primary Examiner* — Mohammad Z Shaikh
(74) *Attorney, Agent, or Firm* — Marshall, Gerstein & Borun LLP

(57) ABSTRACT

The present disclosure generally relates to a computer implemented system and method for automatically generating insurance policy related data. The system and method may determine a vehicle operator and generate empirical vehicle operator identity data. The system and method may further acquire empirical vehicle operation data related to the actual vehicle operator, and correlate the empirical vehicle operator identity data and the empirical vehicle operation data to generate vehicle insurance policy related data. The system and method may further include processing one or more insurance options, including underwriting and pricing, based at least in part on the vehicle insurance policy related data.

17 Claims, 9 Drawing Sheets

Related U.S. Application Data

(60) Provisional application No. 61/775,652, filed on Mar. 10, 2013.

(51) Int. Cl.
| | |
|---|---|
| *G06Q 40/00* | (2012.01) |
| *B60R 25/20* | (2013.01) |
| *G07C 5/00* | (2006.01) |
| *G06Q 30/02* | (2012.01) |

(52) U.S. Cl.
CPC ..... *G06Q 30/0207* (2013.01); *G06Q 30/0208* (2013.01); *G06Q 40/00* (2013.01); *G07C 5/00* (2013.01); *G07C 5/008* (2013.01)

(58) Field of Classification Search
CPC ................ B60W 50/08; B60W 40/08; B60W 2040/0881; B60W 2540/28
USPC ................................................. 705/4, 35–45
See application file for complete search history.

(56) References Cited

U.S. PATENT DOCUMENTS

| | | | |
|---|---|---|---|
| 5,499,182 A | 3/1996 | Ousborne | |
| 5,550,551 A | 8/1996 | Alesio | |
| 5,797,134 A | 8/1998 | McMillan et al. | |
| 6,064,970 A | 5/2000 | McMillan et al. | |
| 6,313,791 B1 | 11/2001 | Klanke | |
| 6,408,232 B1 | 6/2002 | Cannon et al. | |
| 6,434,510 B1 | 8/2002 | Callaghan | |
| 6,718,235 B1 | 4/2004 | Borugian | |
| 6,741,168 B2 | 5/2004 | Webb et al. | |
| 6,831,993 B2* | 12/2004 | Lemelson | B60Q 1/0023 |
| | | | 307/10.5 |
| 6,856,933 B1 | 2/2005 | Callaghan | |
| 6,868,386 B1 | 3/2005 | Henderson et al. | |
| 7,343,306 B1 | 3/2008 | Bates et al. | |
| 7,343,310 B1 | 3/2008 | Stender | |
| 7,571,128 B1 | 8/2009 | Brown | |
| 7,659,827 B2 | 2/2010 | Gunderson et al. | |
| 7,692,552 B2* | 4/2010 | Harrington | G08B 21/06 |
| | | | 180/272 |
| 7,724,145 B2 | 5/2010 | Batra et al. | |
| 7,725,348 B1 | 5/2010 | Allen et al. | |
| 7,812,712 B2 | 10/2010 | White et al. | |
| 7,860,764 B1 | 12/2010 | Alexander et al. | |
| 7,865,378 B2 | 1/2011 | Gay | |
| 7,870,010 B2 | 1/2011 | Joao | |
| 7,873,455 B2* | 1/2011 | Arshad | A01B 79/005 |
| | | | 340/426.1 |
| 7,890,355 B2 | 2/2011 | Gay et al. | |
| 7,930,098 B2* | 4/2011 | Huang | B60R 25/00 |
| | | | 701/468 |
| 7,937,278 B1 | 5/2011 | Cripe et al. | |
| 7,991,629 B2 | 8/2011 | Gay et al. | |
| 8,027,853 B1 | 9/2011 | Kazenas | |
| 8,056,538 B2* | 11/2011 | Harnack | F02D 41/263 |
| | | | 123/479 |
| 8,086,523 B1 | 12/2011 | Palmer | |
| 8,090,598 B2 | 1/2012 | Bauer et al. | |
| 8,140,358 B1 | 3/2012 | Ling et al. | |
| 8,240,480 B2* | 8/2012 | Shaw | B07C 5/3427 |
| | | | 209/11 |
| 8,280,752 B1 | 10/2012 | Cripe et al. | |
| 8,311,858 B2 | 11/2012 | Everett et al. | |
| 8,332,242 B1 | 12/2012 | Medina, III | |
| 8,352,118 B1* | 1/2013 | Mittelsteadt | G07C 5/008 |
| | | | 340/438 |
| 8,359,213 B2 | 1/2013 | Berg et al. | |
| 8,359,259 B2 | 1/2013 | Berg et al. | |
| 8,407,139 B1 | 3/2013 | Palmer | |
| 8,423,239 B2 | 4/2013 | Blumer et al. | |
| 8,489,433 B2 | 7/2013 | Altieri et al. | |
| 8,508,353 B2 | 8/2013 | Cook et al. | |
| 8,527,146 B1* | 9/2013 | Jackson | B60W 50/0098 |
| | | | 180/273 |
| 8,538,789 B1 | 9/2013 | Blank et al. | |
| 8,566,126 B1 | 10/2013 | Hopkins, III | |
| 8,569,141 B2* | 10/2013 | Huang | H01L 27/0629 |
| | | | 257/E21.09 |
| 8,605,948 B2 | 12/2013 | Mathony et al. | |
| 8,606,512 B1 | 12/2013 | Bogovich et al. | |
| 8,606,514 B2 | 12/2013 | Rowley et al. | |
| 8,612,139 B2 | 12/2013 | Wang et al. | |
| 8,630,768 B2 | 1/2014 | McClellan et al. | |
| 8,635,091 B2 | 1/2014 | Amigo et al. | |
| 8,655,544 B2 | 2/2014 | Fletcher et al. | |
| 8,682,699 B2 | 3/2014 | Collins et al. | |
| 8,686,844 B1 | 4/2014 | Wine | |
| 8,725,408 B2 | 5/2014 | Hochkirchen et al. | |
| 8,731,768 B2 | 5/2014 | Fernandes et al. | |
| 8,744,642 B2* | 6/2014 | Nemat-Nasser | B60W 40/09 |
| | | | 340/439 |
| 8,781,900 B2* | 7/2014 | Schwarz | G06Q 30/02 |
| | | | 705/14.25 |
| 8,799,035 B2 | 8/2014 | Coleman et al. | |
| 8,799,036 B1 | 8/2014 | Christensen et al. | |
| 8,812,330 B1 | 8/2014 | Cripe et al. | |
| 8,892,451 B2 | 11/2014 | Everett et al. | |
| 8,935,036 B1 | 1/2015 | Christensen et al. | |
| 8,983,677 B2 | 3/2015 | Wright et al. | |
| 9,008,956 B2 | 4/2015 | Hyde et al. | |
| 9,031,545 B1 | 5/2015 | Srey et al. | |
| 9,098,367 B2 | 8/2015 | Ricci | |
| 9,105,066 B2 | 8/2015 | Gay et al. | |
| 9,141,996 B2* | 9/2015 | Christensen | G07C 5/00 |
| 9,164,957 B2 | 10/2015 | Hassib et al. | |
| 9,183,441 B2 | 11/2015 | Blumer et al. | |
| 9,208,525 B2 | 12/2015 | Hayward et al. | |
| 9,221,428 B2* | 12/2015 | Kote | B60R 25/20 |
| 9,235,750 B1* | 1/2016 | Sutton | G06K 9/00845 |
| 9,256,991 B2 | 2/2016 | Crawford | |
| 9,418,383 B1 | 8/2016 | Hayward et al. | |
| 9,454,786 B1 | 9/2016 | Srey et al. | |
| 9,665,997 B2* | 5/2017 | Morgan | G07C 5/0816 |
| 9,779,458 B2* | 10/2017 | Hayward | G06Q 40/08 |
| 2001/0044733 A1 | 11/2001 | Lee et al. | |
| 2002/0026394 A1 | 2/2002 | Savage et al. | |
| 2002/0111725 A1 | 8/2002 | Burge | |
| 2002/0128985 A1 | 9/2002 | Greenwald | |
| 2002/0198843 A1 | 12/2002 | Wang et al. | |
| 2003/0112133 A1 | 6/2003 | Webb et al. | |
| 2003/0191581 A1 | 10/2003 | Ukai et al. | |
| 2003/0236686 A1 | 12/2003 | Matsumoto et al. | |
| 2004/0039611 A1 | 2/2004 | Hong et al. | |
| 2004/0117358 A1 | 6/2004 | von Kaenel et al. | |
| 2004/0153362 A1 | 8/2004 | Bauer et al. | |
| 2004/0225557 A1* | 11/2004 | Phelan | G01M 17/00 |
| | | | 701/1 |
| 2005/0024185 A1 | 2/2005 | Chuey | |
| 2005/0267784 A1 | 12/2005 | Slen et al. | |
| 2005/0283388 A1 | 12/2005 | Eberwine et al. | |
| 2006/0049025 A1 | 3/2006 | Hara et al. | |
| 2006/0053038 A1* | 3/2006 | Warren | G06Q 40/08 |
| | | | 705/4 |
| 2006/0075120 A1 | 4/2006 | Smit | |
| 2006/0079280 A1 | 4/2006 | LaPerch | |
| 2006/0095301 A1 | 5/2006 | Gay | |
| 2006/0114531 A1 | 6/2006 | Webb et al. | |
| 2006/0247852 A1 | 11/2006 | Kortge et al. | |
| 2007/0005404 A1* | 1/2007 | Raz | G06Q 40/00 |
| | | | 705/4 |
| 2007/0061173 A1 | 3/2007 | Gay | |
| 2007/0106539 A1 | 5/2007 | Gay | |
| 2007/0124045 A1 | 5/2007 | Ayoub et al. | |
| 2007/0156468 A1 | 7/2007 | Gay et al. | |
| 2007/0200663 A1* | 8/2007 | White | A61B 5/117 |
| | | | 340/5.31 |
| 2007/0256499 A1 | 11/2007 | Pelecanos et al. | |
| 2007/0268158 A1* | 11/2007 | Gunderson | G06Q 40/08 |
| | | | 340/933 |
| 2007/0282638 A1 | 12/2007 | Surovy | |

(56) References Cited

U.S. PATENT DOCUMENTS

| | | |
|---|---|---|
| 2007/0288270 A1 | 12/2007 | Gay et al. |
| 2007/0299700 A1 | 12/2007 | Gay et al. |
| 2008/0018466 A1 | 1/2008 | Batra et al. |
| 2008/0027761 A1* | 1/2008 | Bracha .................. G06Q 40/00 705/4 |
| 2008/0051996 A1 | 2/2008 | Dunning et al. |
| 2008/0065427 A1 | 3/2008 | Helitzer et al. |
| 2008/0174451 A1* | 7/2008 | Harrington ............ G08B 21/06 340/905 |
| 2008/0243558 A1 | 10/2008 | Gupte |
| 2008/0255888 A1 | 10/2008 | Berkobin et al. |
| 2009/0002147 A1 | 1/2009 | Bloebaum et al. |
| 2009/0024419 A1* | 1/2009 | McClellan ............ G06Q 40/02 705/4 |
| 2009/0150023 A1 | 6/2009 | Grau et al. |
| 2009/0210257 A1 | 8/2009 | Chalfant et al. |
| 2010/0030568 A1 | 2/2010 | Daman |
| 2010/0066513 A1* | 3/2010 | Bauchot ................. B60R 25/10 340/426.1 |
| 2010/0088123 A1 | 4/2010 | McCall et al. |
| 2010/0131302 A1 | 5/2010 | Collopy et al. |
| 2010/0131304 A1* | 5/2010 | Collopy ............ G06Q 30/0224 705/4 |
| 2010/0138244 A1 | 6/2010 | Basir |
| 2010/0185534 A1 | 7/2010 | Satyavolu et al. |
| 2010/0223080 A1 | 9/2010 | Basir et al. |
| 2010/0238009 A1 | 9/2010 | Cook et al. |
| 2011/0022421 A1 | 1/2011 | Brown et al. |
| 2011/0040579 A1 | 2/2011 | Havens |
| 2011/0106370 A1 | 5/2011 | Duddle et al. |
| 2011/0125363 A1 | 5/2011 | Blumer et al. |
| 2011/0137685 A1 | 6/2011 | Tracy et al. |
| 2011/0153367 A1 | 6/2011 | Amigo et al. |
| 2011/0161117 A1 | 6/2011 | Busque et al. |
| 2011/0161118 A1 | 6/2011 | Borden et al. |
| 2011/0195699 A1* | 8/2011 | Tadayon .............. H04B 5/0062 455/418 |
| 2011/0200052 A1 | 8/2011 | Mungo et al. |
| 2011/0213628 A1 | 9/2011 | Peak et al. |
| 2011/0267186 A1* | 11/2011 | Rao ........................ B60K 28/08 340/449 |
| 2011/0304446 A1* | 12/2011 | Basson ................ B60K 28/063 340/438 |
| 2011/0307188 A1 | 12/2011 | Peng et al. |
| 2012/0004933 A1 | 1/2012 | Foladare et al. |
| 2012/0021386 A1 | 1/2012 | Anderson et al. |
| 2012/0029945 A1 | 2/2012 | Altieri et al. |
| 2012/0065834 A1* | 3/2012 | Senart .................... G07C 5/008 701/31.4 |
| 2012/0072243 A1 | 3/2012 | Collins et al. |
| 2012/0072244 A1 | 3/2012 | Collins et al. |
| 2012/0089423 A1 | 4/2012 | Tamir et al. |
| 2012/0089701 A1 | 4/2012 | Goel |
| 2012/0101855 A1 | 4/2012 | Collins et al. |
| 2012/0109418 A1 | 5/2012 | Lorber |
| 2012/0109692 A1* | 5/2012 | Collins .................. G06Q 40/08 705/4 |
| 2012/0158436 A1 | 6/2012 | Bauer et al. |
| 2012/0190386 A1 | 7/2012 | Anderson |
| 2012/0197669 A1 | 8/2012 | Kote et al. |
| 2012/0209632 A1 | 8/2012 | Kaminski et al. |
| 2012/0209634 A1 | 8/2012 | Ling et al. |
| 2012/0214472 A1* | 8/2012 | Tadayon .............. H04B 5/0062 455/418 |
| 2012/0259665 A1 | 10/2012 | Pandhi et al. |
| 2012/0323531 A1 | 12/2012 | Pascu et al. |
| 2012/0323772 A1 | 12/2012 | Michael |
| 2012/0330499 A1 | 12/2012 | Scheid et al. |
| 2013/0006675 A1 | 1/2013 | Bowne et al. |
| 2013/0013347 A1 | 1/2013 | Ling et al. |
| 2013/0013348 A1 | 1/2013 | Ling et al. |
| 2013/0018677 A1 | 1/2013 | Chevrette |
| 2013/0041521 A1* | 2/2013 | Basir ..................... B60R 25/33 701/1 |
| 2013/0041621 A1 | 2/2013 | Smith et al. |
| 2013/0046510 A1 | 2/2013 | Bowne et al. |
| 2013/0046559 A1 | 2/2013 | Coleman et al. |
| 2013/0046562 A1 | 2/2013 | Taylor et al. |
| 2013/0046646 A1 | 2/2013 | Malan |
| 2013/0073114 A1* | 3/2013 | Nemat-Nasser ...... B60W 40/09 701/1 |
| 2013/0110310 A1 | 5/2013 | Young |
| 2013/0117050 A1 | 5/2013 | Berg et al. |
| 2013/0144474 A1 | 6/2013 | Ricci |
| 2013/0144657 A1 | 6/2013 | Ricci |
| 2013/0151064 A1 | 6/2013 | Becker et al. |
| 2013/0161110 A1* | 6/2013 | Furst ..................... A47C 31/126 180/273 |
| 2013/0166098 A1* | 6/2013 | Lavie ..................... G06F 17/00 701/1 |
| 2013/0166326 A1 | 6/2013 | Lavie et al. |
| 2013/0188794 A1 | 7/2013 | Kawamata et al. |
| 2013/0211662 A1 | 8/2013 | Blumer et al. |
| 2013/0226624 A1 | 8/2013 | Blessman et al. |
| 2013/0244210 A1 | 9/2013 | Nath et al. |
| 2013/0262530 A1 | 10/2013 | Collins et al. |
| 2013/0289819 A1 | 10/2013 | Hassib et al. |
| 2013/0297387 A1 | 11/2013 | Michael |
| 2013/0304276 A1 | 11/2013 | Flies |
| 2013/0304515 A1 | 11/2013 | Gryan et al. |
| 2013/0317693 A1 | 11/2013 | Jefferies et al. |
| 2013/0325519 A1 | 12/2013 | Tracy et al. |
| 2013/0345896 A1 | 12/2013 | Blumer et al. |
| 2014/0012604 A1 | 1/2014 | Allen, Jr. |
| 2014/0019167 A1* | 1/2014 | Cheng .................... G06Q 40/08 705/4 |
| 2014/0019170 A1 | 1/2014 | Coleman et al. |
| 2014/0025401 A1 | 1/2014 | Hagelstein et al. |
| 2014/0046701 A1 | 2/2014 | Steinberg et al. |
| 2014/0052479 A1 | 2/2014 | Kawamura |
| 2014/0058761 A1 | 2/2014 | Freiberger et al. |
| 2014/0074345 A1 | 3/2014 | Gabay et al. |
| 2014/0074402 A1 | 3/2014 | Hassib et al. |
| 2014/0089101 A1 | 3/2014 | Meller |
| 2014/0108058 A1 | 4/2014 | Bourne et al. |
| 2014/0111647 A1 | 4/2014 | Atsmon et al. |
| 2014/0114696 A1 | 4/2014 | Amigo et al. |
| 2014/0180723 A1 | 6/2014 | Cote et al. |
| 2014/0257865 A1 | 9/2014 | Gay et al. |
| 2014/0257866 A1 | 9/2014 | Gay et al. |
| 2014/0257867 A1 | 9/2014 | Gay et al. |
| 2014/0257868 A1 | 9/2014 | Hayward et al. |
| 2014/0257869 A1 | 9/2014 | Binion et al. |
| 2014/0257870 A1 | 9/2014 | Cielocha et al. |
| 2014/0257871 A1 | 9/2014 | Christensen et al. |
| 2014/0257872 A1 | 9/2014 | Christensen et al. |
| 2014/0257873 A1 | 9/2014 | Hayward et al. |
| 2014/0257874 A1 | 9/2014 | Hayward et al. |
| 2014/0278574 A1 | 9/2014 | Barber |
| 2014/0304011 A1 | 10/2014 | Yager et al. |
| 2014/0310028 A1 | 10/2014 | Christensen et al. |
| 2016/0086393 A1* | 3/2016 | Collins .................. G06Q 40/08 701/31.5 |

OTHER PUBLICATIONS

Nerad, "Insurance by the Mile", AntiqueCar.com, Mar. 11, 2007, downloaded from the Internet at: <http://www.antiquecar.com/feature_insurance_by_the_mile.php> (3 pages).

U.S. Appl. No. 14/203,015, Notice of Allowance, dated Mar. 31, 2015.

U.S. Appl. No. 14/203,015, Office Action, dated May 22, 2014.

U.S. Appl. No. 14/203,015, Office Action, dated Oct. 29, 2014.

U.S. Appl. No. 14/203,338, Final Office Action, dated Oct. 6, 2014.

U.S. Appl. No. 14/203,338, Notice of Allowance, dated May 20, 2015.

U.S. Appl. No. 14/203,338, Office Action, dated Feb. 3, 2015.

U.S. Appl. No. 14/203,338, Office Action, dated Jun. 2, 2014.

U.S. Appl. No. 14/203,349, Final Office Action, dated Mar. 17, 2015.

U.S. Appl. No. 14/203,349, Final Office Action, dated Dec. 3, 2015.

(56) References Cited

OTHER PUBLICATIONS

U.S. Appl. No. 14/203,349, Nonfinal Office Action, dated Feb. 10, 2017.
U.S. Appl. No. 14/203,349, Nonfinal Office Action, dated Jun. 15, 2015.
U.S. Appl. No. 14/203,349, Nonfinal Office Action, dated May 20, 2014.
U.S. Appl. No. 14/203,349, Nonfinal Office Action, dated Oct. 23, 2014.
U.S. Appl. No. 14/203,349, Notice of Allowance, dated Jul. 26, 2017.

* cited by examiner

SYSTEMS AND METHODS FOR GENERATING VEHICLE INSURANCE POLICY DATA BASED ON EMPIRICAL VEHICLE RELATED DATA

CROSS-REFERENCE TO RELATED APPLICATIONS

This application is a continuation of U.S. patent application Ser. No. 14/203,349, filed on Mar. 10, 2014, which claims the benefit of U.S. Provisional Application No. 61/775,652, filed on Mar. 10, 2013. The disclosure of each of which is incorporated by reference herein in its entirety.

TECHNICAL FIELD

The present disclosure generally relates to systems and methods for assessing, pricing, and provisioning vehicle insurance. In particular, the present disclosure relates to systems and methods for generating vehicle insurance policy data based on empirical vehicle operator identity data and empirical vehicle operation data.

BACKGROUND

Vehicle insurance policies may be based, at least in part, on information related to a vehicle insurance policy applicant, such as age of the applicant, gender of the applicant, number of prior insurance claim(s) that the applicant has submitted, driving record of the applicant, etc. Vehicle insurance policies may also be based, at least in part, on information related to a driving routine associated with the vehicle insurance policy applicant, such as where the insurance applicant lives and where the applicant drives to work.

Various sensors, such as seat belt sensors, seat occupancy sensors, vehicle telematics sensors, infrared sensors, vibration sensors, image sensors, ultrasonic sensors, etc., are being incorporated within modern-day vehicles. Data derived from associated sensors is used to monitor and/or control vehicle operation.

SUMMARY

Generating vehicle insurance policy related data based on empirical vehicle related data is desirable. In particular, it is desirable to automatically generate insurance policy related data based on empirical data related to a vehicle operator identity and/or empirical data related to vehicle operation.

A computer implemented method for automatically generating insurance policy data, that is representative of a vehicle insurance policy, may include receiving, at one or more processors, empirical vehicle operator identity data that may be representative of an identity of a vehicle operator. The method may further include receiving, at one or more processors, empirical vehicle operation data that may be representative of actual operation of a vehicle and that may be, at least partially, based on vehicle sensor data. The method may also include correlating, by one or more processors, at least a portion of the empirical vehicle operator identity data with at least a portion of the empirical vehicle operation data. The method may yet further include generating, by one or more processors, vehicle insurance policy related data based, at least in part, on the correlated empirical vehicle operator identity data and empirical vehicle operation data.

In an embodiment, a system for automatically generating vehicle insurance policy related data, that is representative of a vehicle insurance policy, may include an empirical vehicle operator identity data acquisition module stored on a memory that, when executed by a processor, causes the processor to acquire empirical vehicle operator identity data that may be representative of an identity of a vehicle operator. The system may also include an empirical vehicle operation data acquisition module stored on a memory that, when executed by a processor, causes the processor to acquire empirical vehicle operation data that may be representative of operation of a vehicle. The system may further include a vehicle insurance policy data generation module stored on a memory that, when executed by a processor, causes the processor to generate vehicle insurance policy related data based, at least in part, on the empirical vehicle operator identity data and the empirical vehicle operation data.

In another embodiment, a tangible, computer-readable medium may store instructions that, when executed by a process, cause the processor to automatically generate vehicle insurance policy related data that is representative of a vehicle insurance policy. The tangible, computer-readable medium may also include an empirical vehicle operator identity data acquisition module that, when executed by a processor, causes the processor to acquire empirical vehicle operator identity data that may be representative of an identity of a vehicle operator. The tangible, computer-readable medium may further include an empirical vehicle operation data acquisition module that, when executed by a processor, causes the processor to acquire empirical vehicle operation data that may be representative of operation of a vehicle. The tangible, computer-readable medium may also include a vehicle insurance policy data generation module that, when executed by a processor, causes the processor to generate vehicle insurance policy related data based, at least in part, on the empirical vehicle operator identity data and the empirical vehicle operation data.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

While vehicle insurance rates are typically based, at least in part, on information associated with an applicant, or applicants, seeking insurance coverage, undisclosed drivers often operate the associated vehicle(s). Methods and systems are provided that automatically generate vehicle insurance policy related data based on empirical vehicle operator identity data. The empirical vehicle operator identity data may be representative of an identity of an operator, or operators, that have actually operated an associated insured vehicle. Empirical vehicle operator identity data may, for example, be based on data acquired from various vehicle sensors, such as seat occupancy sensors, seatbelt sensors, body heat sensors (e.g., infrared sensors), weight sensors (e.g., pressure transducers), cameras (e.g., image sensors), etc. The vehicle sensor data may be time stamped.

In addition to vehicle insurance policy rates being based on information pertaining to an insurance applicant, vehicle insurance policy rates may be based on information related to operation of the vehicle. For example, vehicle insurance customers who operate their vehicles for less time generally pay a lower amount for vehicle insurance when compared to customers who operate their vehicles frequently, all other factors being equal. In addition to, or as an alternative to, generating vehicle insurance policy data based on empirical vehicle operator identity data, the present systems and methods may generate vehicle insurance policy data based on empirical vehicle operation data. Empirical vehicle operation related data may be representative of an amount of time an insured vehicle was actually in use. For example, travel time may be used as a unit of exposure for, at least in part, determining a vehicle insurance rate. In particular, a vehicle motion sensor (e.g., a vehicle speedometer sensor, a vehicle odometer sensor, a vibration sensor or a light sensor) may be used to detect motion of a vehicle. Data received from a vehicle motion sensor may be time stamped. The time stamped vehicle motion sensor data may be used to generate, record and transmit empirical vehicle operation related data that may be representative of a length of time a vehicle was in use.

Figure 1:
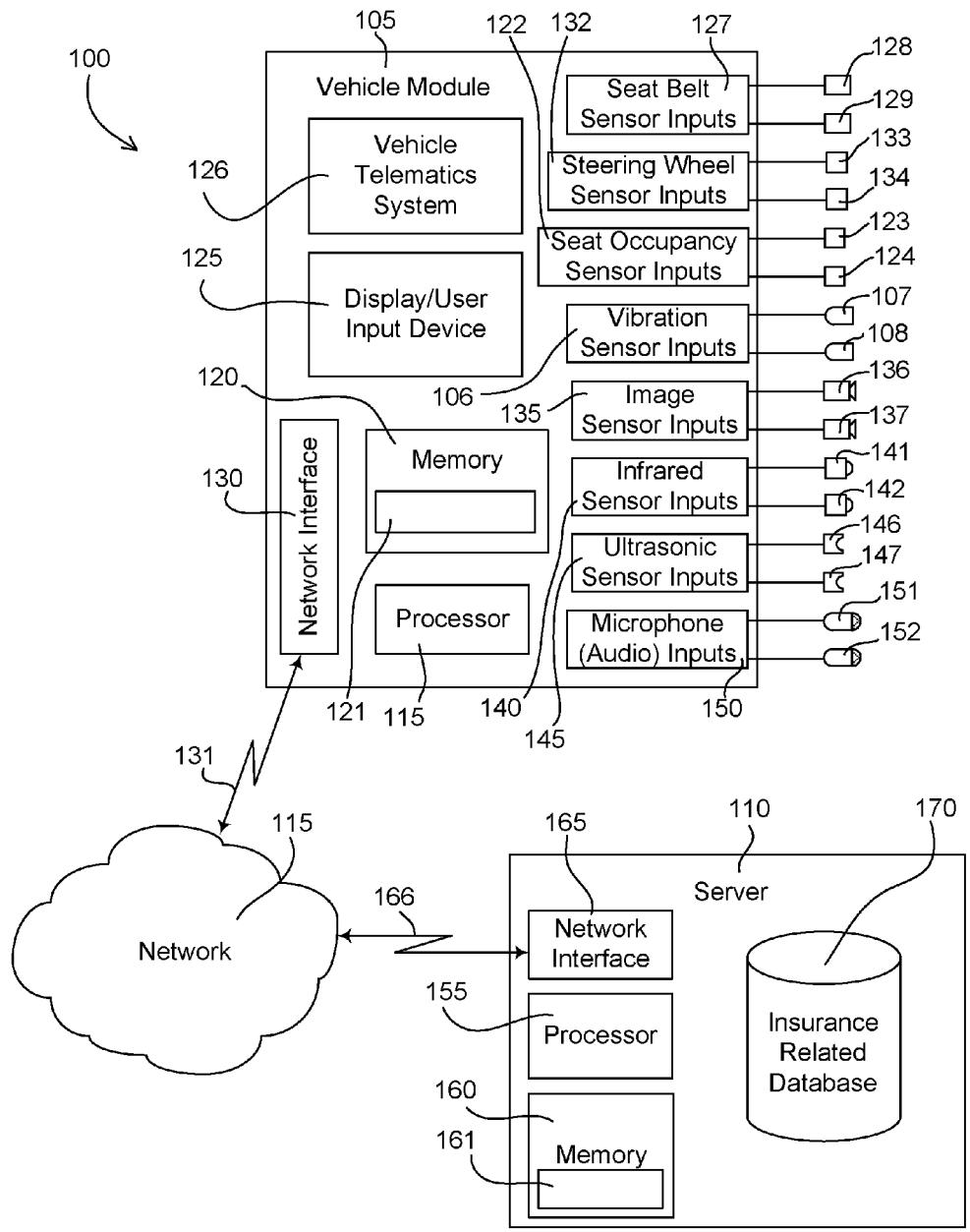
FIG. 1 illustrates a block diagram of a computer system on which an exemplary vehicle insurance policy data generation system and method may operate in accordance with the described embodiments.

Turning to FIG. 1, a high-level block diagram of a vehicle insurance policy data generation system 100 is illustrated that may implement communications between a vehicle module 105 and a remote computing device 110 (e.g., a remote server) to receive vehicle sensor data, to generate empirical vehicle operator identity data, to generate empirical vehicle operation data and to generate vehicle insurance policy data. For example, the vehicle insurance policy data generation system 100 may acquire data from vehicle sensors (e.g., vehicle telematics systems sensors, seat belt sensors, steering wheel sensors, seat occupancy sensors, vibration sensors, image sensors, infrared sensors ultrasonic sensors, audio sensors, pressure sensors, etc.) and generate empirical vehicle operator identity data, empirical vehicle operation data and vehicle insurance policy data based on the vehicle sensor data. These vehicle sensors may, for example, be located as denoted with regard to reference numbers 225a, 235a, 245a, 260a, 280b of FIGS. 2A and 2B.

For clarity, only one vehicle module 105 is depicted in FIG. 1. While FIG. 1 depicts only one vehicle module 105, it should be understood that any number of vehicle modules 105 may be supported. The vehicle module 105 may include a memory 120 and a processor 125 for storing and executing, respectively, a module 121. The module 121, stored in the memory 120 as a set of computer-readable instructions, may be related to an empirical vehicle operator identity data module (e.g., empirical vehicle operator identity data module 421 of FIG. 4) and/or an empirical vehicle operation data module (e.g., empirical vehicle operation data module 422 of FIG. 4). Execution of the module 121 may also cause the process 125 to associate the empirical vehicle operator identity data and/or the empirical vehicle operation data with a time and, or date (i.e., "time stamp" the data). Execution of the module 121 may also cause the processor 125 to receive known vehicle operator identity data from, for example, an insurance related database (e.g., insurance related database 170 of FIG. 1). Execution of the module 121 may further cause the processor 125 to communicate with the processor 155 of the remote computing device 110 via the network interface 130, the vehicle module communications network connection 131 and the wireless communication network 115 to transmit empirical vehicle operator identity data and/or the empirical vehicle operation data from the vehicle module 105 to the remote server 110.

The vehicle module 105 may further include an image sensor input 135 communicatively connected to a first image sensor 136 and a second image sensor 137. While two image sensors 136, 137 are depicted in FIG. 1, any number of image sensors may be included. The vehicle module 105 may also include an infrared sensor input 140 communicatively connected to a first infrared sensor 141 and a second infrared sensor 142. While two infrared sensors 141, 142 are depicted in FIG. 1, any number of infrared sensors may be included. The vehicle module 105 may further include an ultrasonic sensor input 145 communicatively connected to a first ultrasonic sensor 146 and a second ultrasonic sensor 147. While two ultrasonic sensors 146, 147 are depicted in FIG. 1, any number of ultrasonic sensors may be included. The vehicle module 105 may also include a microphone input 150 communicatively connected to a first microphone 151 and a second microphone 152. While two microphones 151, 152 are depicted in FIG. 1, any number of microphones may be included. The vehicle module 105 may also include a vibration sensor inputs 106 communicatively connected to a first vibration sensor 107 and a second vibration sensor 108. While two vibration sensors 107, 108 are depicted in FIG. 1, any number of vibration sensors may be included. The vehicle module 105 may also include seat occupancy sensor inputs 122 communicatively connected to a first seat occupancy sensor 123 and a second seat occupancy sensor 124. While two seat occupancy sensors 123, 124 are depicted in FIG. 1, any number of seat occupancy sensors may be included. Any one of the seat occupancy sensors 123, 124 may be, for example, an ultrasonic sensor, a pressure sensor, a body heat sensor (e.g., an infrared sensor) or a camera/video sensor (e.g., an image sensor). The vehicle module 105 may also include steering wheel sensor inputs 132 communicatively connected to a first steering wheel sensor 133 and a second steering wheel sensor 134. While two steering wheel sensors 133, 134 are depicted in FIG. 1, any number of steering wheel sensors may be included. Any one of the steering wheel sensors 133, 134 may be, for example, an ultrasonic sensor, a pressure sensor, a body heat sensor (e.g., an infrared sensor) or a camera/video sensor (e.g., an image sensor). The vehicle module 105 may also include seat belt sensor inputs 127 communicatively connected to a first seat belt sensor 128 and a second seat belt sensor 129. While two seat belt sensors 128, 129 are depicted in FIG. 1, any number of seat belt sensors may be included. The vehicle module 105 may further include vehicle telematics system inputs 126. The vehicle telematics system inputs 126 may include, for example, a global positioning system (GPS) sensor, a vehicle speedometer sensor, a vehicle odometer sensor, a vehicle air bag sensor, a vehicle interior temperature sensor, a vehicle exterior temperature sensor, a vehicle pitch sensor, a vehicle yaw sensor and/or a time and day clock sensor. The vehicle module 105 may further include a display/user input device 125.

Figure 2A:
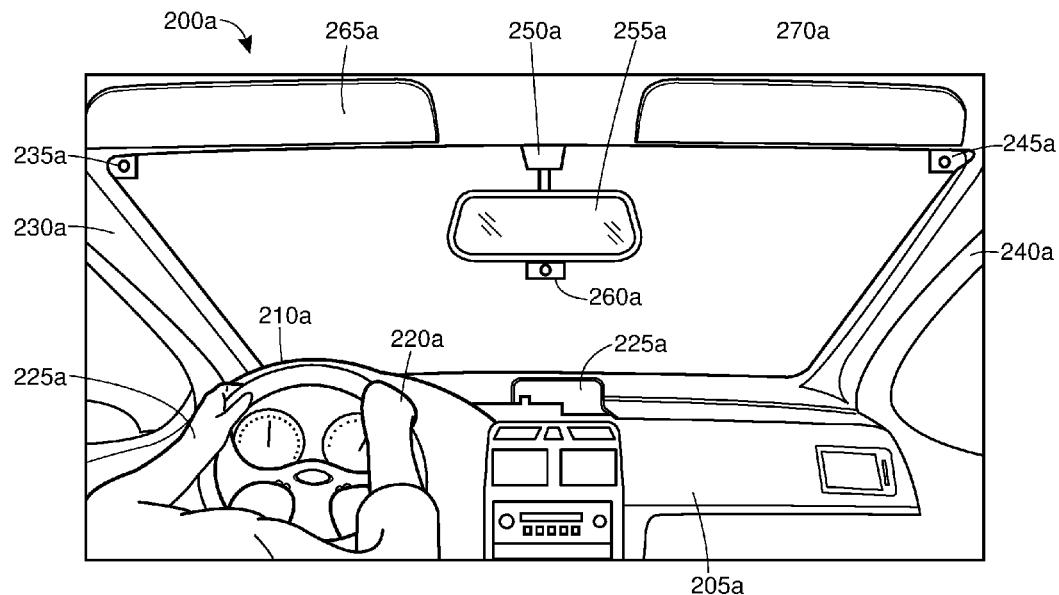
FIGS. 2A-2C depict various views of the interior of an example vehicle that illustrate locations of vehicle sensors within, and on, a vehicle.

As one example, a first image sensor 136 may be located in a driver-side A-pillar (e.g., location of vehicle sensor 235a of FIG. 2A), a second image sensor 137 may be located in a passenger-side A-pillar (e.g., location of vehicle sensor 245a of FIG. 2A), a first infrared sensor 141 may be located in a driver-side B-pillar (e.g., location of vehicle sensor 280b of FIG. 2B), a second infrared sensor 142 may be located in a passenger-side B-pillar (not shown in the Figs.), first and second ultrasonic sensors 146, 147 may be located in a center portion of a vehicle dash (e.g., location of vehicle sensor 225a of FIG. 2A) and first and second microphones 151, 152 may be located on a bottom portion of a vehicle interior rearview mirror (e.g., location of vehicle sensor 260a of FIG. 2A). The processor 115 may acquire vehicle sensor data from any one of, or all of, these vehicle sensors 107, 108, 123, 124, 126, 128, 129, 133, 134, 136, 137, 141, 142, 146, 147, 151, 152 and may generate real-time vehicle operator identity data, empirical vehicle operator identity data and/or empirical vehicle operation data based on the vehicle sensor data. The processor 115 may transmit empirical vehicle operator identity data and/or empirical vehicle operation data to the remote computing device 110. Alternatively, the processor 115 may transmit vehicle sensor data and/or real-time vehicle operator identity data to the remote computing device 110 and the processor 155 may generate empirical vehicle operator identity data and/or empirical vehicle operation data based on the vehicle sensor data and/or real-time vehicle operator identity data.

The network interface 130 may be configured to facilitate communications between the vehicle module 105 and the remote computing device 110 via any hardwired or wireless communication network 115, including for example a wireless LAN, MAN or WAN, WiFi, the Internet, a Bluetooth connection, or any combination thereof. Moreover, the vehicle module 105 may be communicatively connected to the remote computing device 110 via any suitable communication system, such as via any publicly available or privately owned communication network, including those that use wireless communication structures, such as wireless communication networks, including, for example, wireless LANs and WANs, satellite and cellular telephone communication systems, etc. The vehicle module 105 may cause insurance risk related data to be stored in a remote computing device 110 memory 160 and/or a remote insurance related database 170.

The remote computing device 110 may include a memory 160 and a processor 155 for storing and executing, respectively, a module 161. The module 161, stored in the memory 160 as a set of computer-readable instructions, facilitates applications related to generation of vehicle insurance policy data. The module 161 may also facilitate communications between the computing device 110 and the vehicle module 105 via a network interface 165, a remote computing device network connection 166 and the network 115 and other functions and instructions.

The computing device 110 may be communicatively coupled to an insurance related database 170. While the insurance related database 170 is shown in FIG. 1 as being communicatively coupled to the remote computing device 110, it should be understood that the insurance related database 170 may be located within separate remote servers (or any other suitable computing devices) communicatively coupled to the remote computing device 110. Optionally, portions of insurance related database 170 may be associated with memory modules that are separate from one another, such as a memory 120 of the vehicle module 105. The processor 155 may further execute the module 161 to store known vehicle operator identity data within the insurance related database 170. The known vehicle operator identity data may be generated based on digital images of individuals associated with an insurance policy application and/or other authorized drivers associated with an insurance policy application.

Figure 2B:
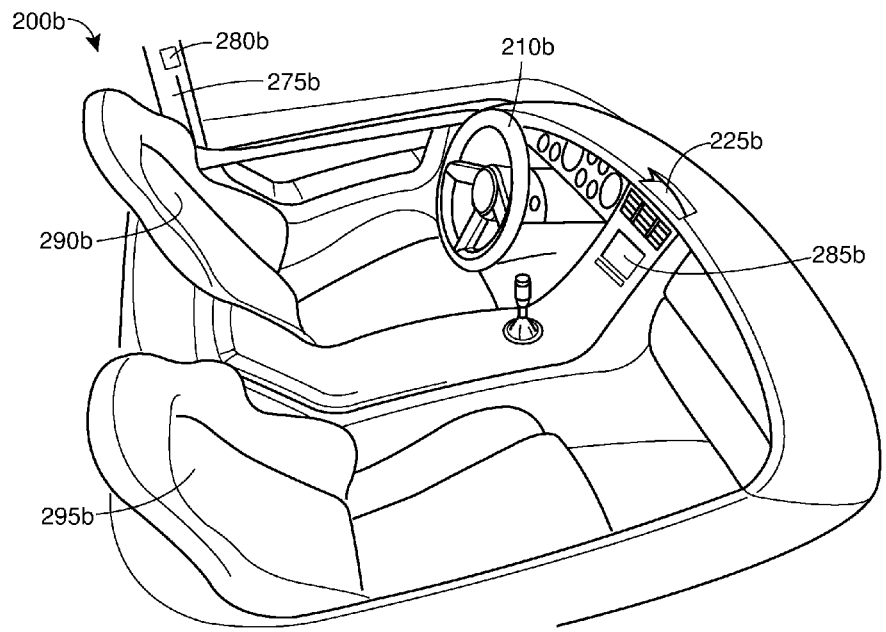
Figure 2C:
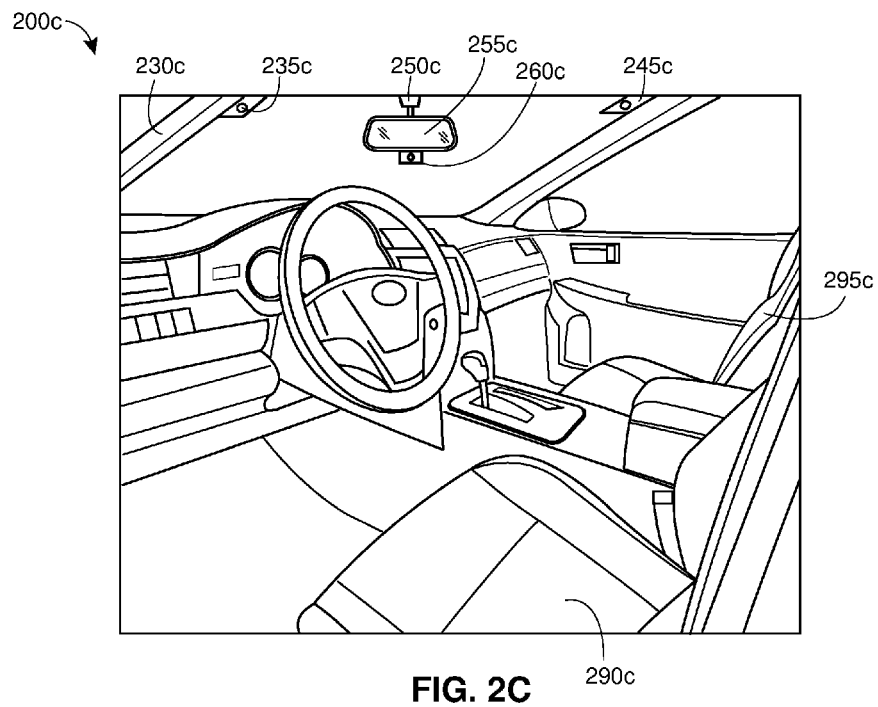

Turning to FIGS. 2A-2C, vehicle sensor systems 200a, 200b, 200c are illustrated. As depicted in FIG. 2A, the vehicle sensor system 200a may include a center-dash vehicle sensor 225a located in a center area of the dash, a driver-side A-pillar vehicle sensor 235a located in a driver side A-pillar 230a, a passenger-side A-pillar vehicle sensor 245a located in a passenger-side A-pillar 240a and a rearview mirror vehicle sensor 260a located on a bottom-side of the rearview mirror 255a. The vehicle sensor system 200a may further, or alternatively, include vehicle sensors in a driver-side visor 265a, a passenger-side visor 270a, a rearview mirror mounting bracket 250a and, or the steering wheel 210a. As described in detail herein, a position of a left-hand 215a of a vehicle driver and, or a position of a right-hand 220a of the vehicle driver, relative to a vehicle steering wheel 210a may be determined based on data acquired from any one of the vehicle sensors 225a, 235a, 245a, 260a. Any one of the vehicle sensors 225a, 235a, 245a, 260a may be an image sensor 136, 137, a pressure sensor 123, 124, a vibration sensor 107, 108, an infrared sensor 141, 142, an ultrasonic sensor 145, 146, a microphone 151, 152 or any other suitable vehicle sensor. Empirical vehicle operator identity data, real-time vehicle operator identity data and/or empirical vehicle operation data may be generated based on data received from any one of, or any combination of, vehicle sensors shown in FIG. 2A.

With reference to FIG. 2B, the vehicle sensor system 200b may include a driver-side B-pillar vehicle sensor 280b located in a driver-side B-pillar 275b and a center-dash vehicle sensor 225b located in a center area of the dash. While not shown in FIG. 2B, the vehicle sensor system 200b may include a passenger-side B-pillar vehicle sensor and, or any other vehicle sensors as described in conjunction with FIG. 2A. The vehicle sensor system 200b may further include a display device 285b. The display device 285b may be located in a center-console area. As illustrated in FIG. 2B, data acquired from the vehicle sensors 225b, 280b may be used to determine an identity of an occupant of a driver-side seat 290b, a passenger-side seat 295b, a position of hands on a steering wheel 210b and, or at least a portion of a face of a vehicle driver (not shown in FIG. 2B). Empirical vehicle operator identity data, real-time vehicle operator identity data and/or empirical vehicle operation data may be generated based on data received from any one of, or any combination of, vehicle sensors shown in FIG. 2B.

Turning to FIG. 2C, the vehicle sensor system 200c may include a driver-side A-pillar vehicle sensor 235c located in a driver side A-pillar 230c, a passenger-side A-pillar vehicle sensor 245c located in a passenger-side A-pillar 240c and a rearview mirror vehicle sensor 260c located on a bottom-side of the rearview mirror 255c. The vehicle sensor system 200c may further, or alternatively, include vehicle sensors in a rearview mirror mounting bracket 250c and, or the steering wheel 210c. While not shown in FIG. 2C, the vehicle monitoring system 200c may include any other vehicle sensors as described in conjunction with FIGS. 2A and 2B. As illustrated in FIG. 2C, data acquired from the vehicle sensors 235c, 245c may be used to generate vehicle operator identity data corresponding to an occupant of a driver-side seat 290c, a passenger-side seat 295c occupancy, a position of hands on a steering wheel 210c and, or at least a portion of a face of a vehicle driver (not shown in FIG. 2C). Driver position within the driver-side seat 290c may, for example, be inferred from shifting weight on the seat 290c. Shifting weight on a seat may be determined via a signal obtained from a pressure transducer 123, 124 located with the seat. Empirical vehicle operator identity data, real-time vehicle operator identity data and/or empirical vehicle operation data may be generated based on data received from any one of, or any combination of, vehicle sensors shown in FIG. 2C.

Figure 3A:
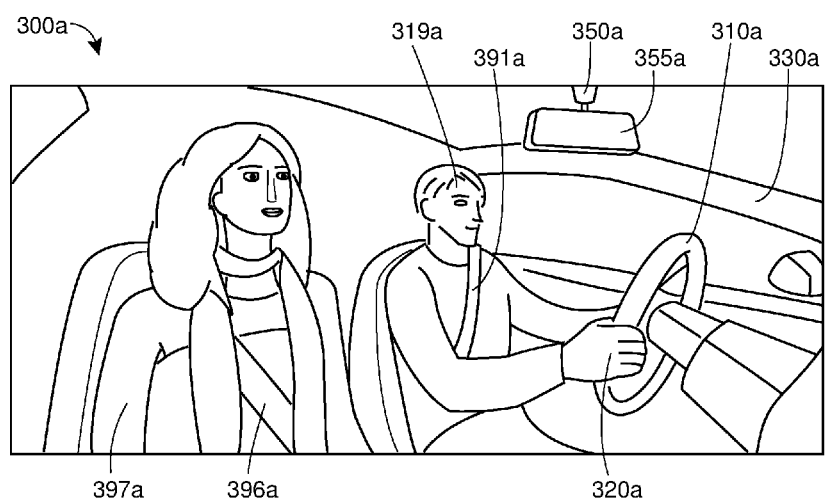
FIGS. 3A-3C illustrate various example images constructed from data retrieved from the vehicle devices of FIGS. 2A-2C.
Figure 3B:
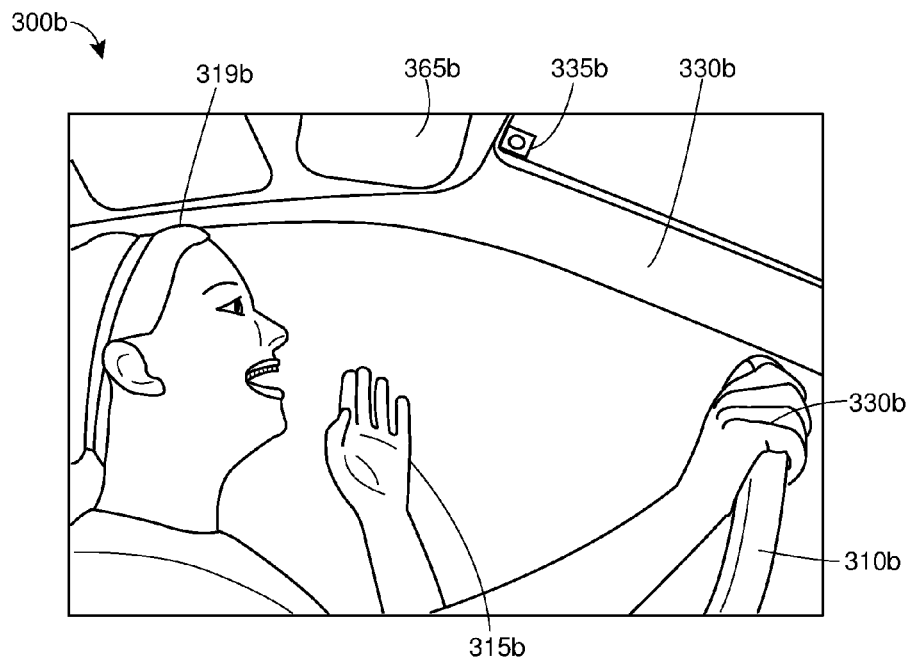
Figure 3C:
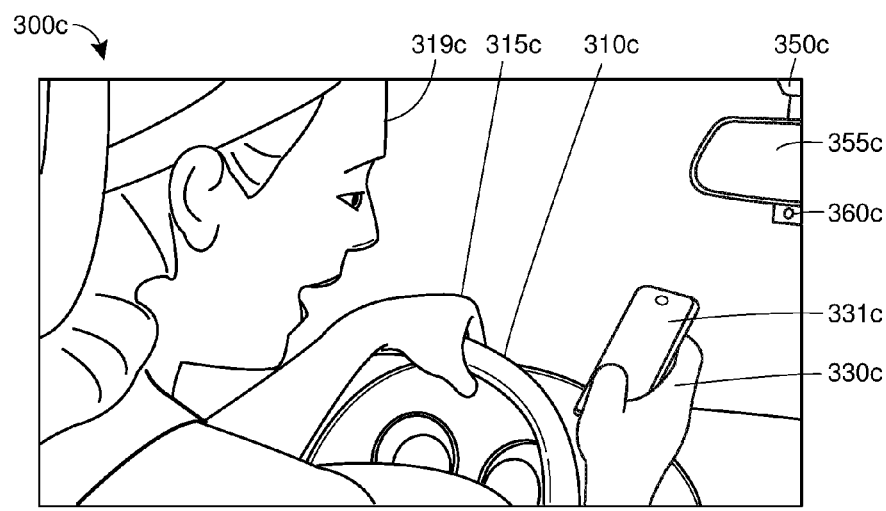

With reference to FIGS. 3A-3C, vehicle interiors 300a, 300b, 300c are depicted. As described in detail herein, data acquired from the vehicle sensors 325a, 335a, 345a, 360a, 380b of FIGS. 3A and 3B (or any other suitably located vehicle sensors) may be used to determine a position of at least a portion of a passenger 397a within the vehicle interior 300a. The data acquired from the vehicle sensors 325a, 335a, 345a, 360a, 380b (or any other suitably located vehicle sensors) may be used to determine whether, or not the passenger 397a is wearing a seatbelt 396a. As further illustrated in FIG. 3A, data acquired from the vehicle sensors 325a, 335a, 345a, 360a, 380b of FIGS. 3A and 3B (or any other suitably located vehicle sensors) may be used to determine a position and, or orientation of a vehicle driver's head 319a and, or right-hand 320a on a steering wheel 310a. For example, the data acquired from the vehicle sensors 325a, 335a, 345a, 360a, 380b may be used to determine whether the vehicle driver's head 319a is oriented toward a rearview mirror 355a, oriented toward the driver-side A-pillar 330a or oriented toward the front windshield. The data acquired from the vehicle sensors 325a, 335a, 345a, 360a, 380b may be used to determine whether the driver is wearing a seatbelt 391a. In any event, the vehicle interior 300a may include a microphone 350a located proximate the rearview mirror 355a. As described in detail herein, data acquired from the microphone 350a may be used to determine a source of sound within and/or around the vehicle 300a and, or a volume of the sound. Empirical vehicle operator identity data, real-time vehicle operator identity data and/or empirical vehicle operation data may be generated based on data received from any one of, or any combination of, vehicle sensors shown in FIG. 3A.

FIG. 3B depicts a vehicle interior 300b including a driver-side A-pillar vehicle sensor 335b located on a driver-side A-pillar 330b. As described in detail herein, data acquired from the vehicle sensor 335b (along with any other suitably located vehicle sensors) may be used to determine a position and, or orientation of a driver's head 319b, the driver's left hand 315b and, or right hand 320b relative to the steering wheel 310b. For example, data acquired from the vehicle sensor 335b (along with any other suitably located vehicle sensors) may be used to determine a gesture that the driver is performing with her left hand 315b. Empirical vehicle operator identity data, real-time vehicle operator identity data and/or empirical vehicle operation data may be generated based on data received from any one of, or any combination of, vehicle sensors shown in FIG. 3B. For example, data from a microphone 151, 152 may be used to identify a vehicle operator and/or a number of occupants. In particular, a number of distinct voices may be determined based on data from a microphone 151, 152. Alternatively, or additionally, the number of door opening and closing sounds may be determined based on data from a microphone 151, 152. Furthermore, data from a microphone 151, 152 may be also be used to identify a particular vehicle.

Turning to FIG. 3C, a vehicle interior 300b depicts a vehicle sensor 360c located on a bottom side of a rearview mirror 355c opposite a rearview mirror mount 350c. As described in detail herein, data acquired from the vehicle sensor 360c (along with any other suitably located vehicle sensors) may be used to determine a position and, or orientation of a driver's head 319c, the driver's left hand 315c and, or right hand 320c relative to the steering wheel 310c. For example, data acquired from the vehicle sensor 360c (along with any other suitably located vehicle sensors) may be used to determine that the driver's head 319c is oriented toward a cellular telephone 321c in her right hand 320c. Alternatively, or additionally, data acquired from the position sensor 360c (along with any other suitably located vehicle sensors) may be used to determine the presence of a cell phone in a driver's hand. As also described in detail herein, a determination may be made that the driver is inattentive to the road based on the driver's head 319c being oriented toward the cellular telephone 321c. Empirical vehicle operator identity data, real-time vehicle operator identity data and/or empirical vehicle operation data may be generated based on data received from any one of, or any combination of, vehicle sensors shown in FIG. 3C.

Figure 4:
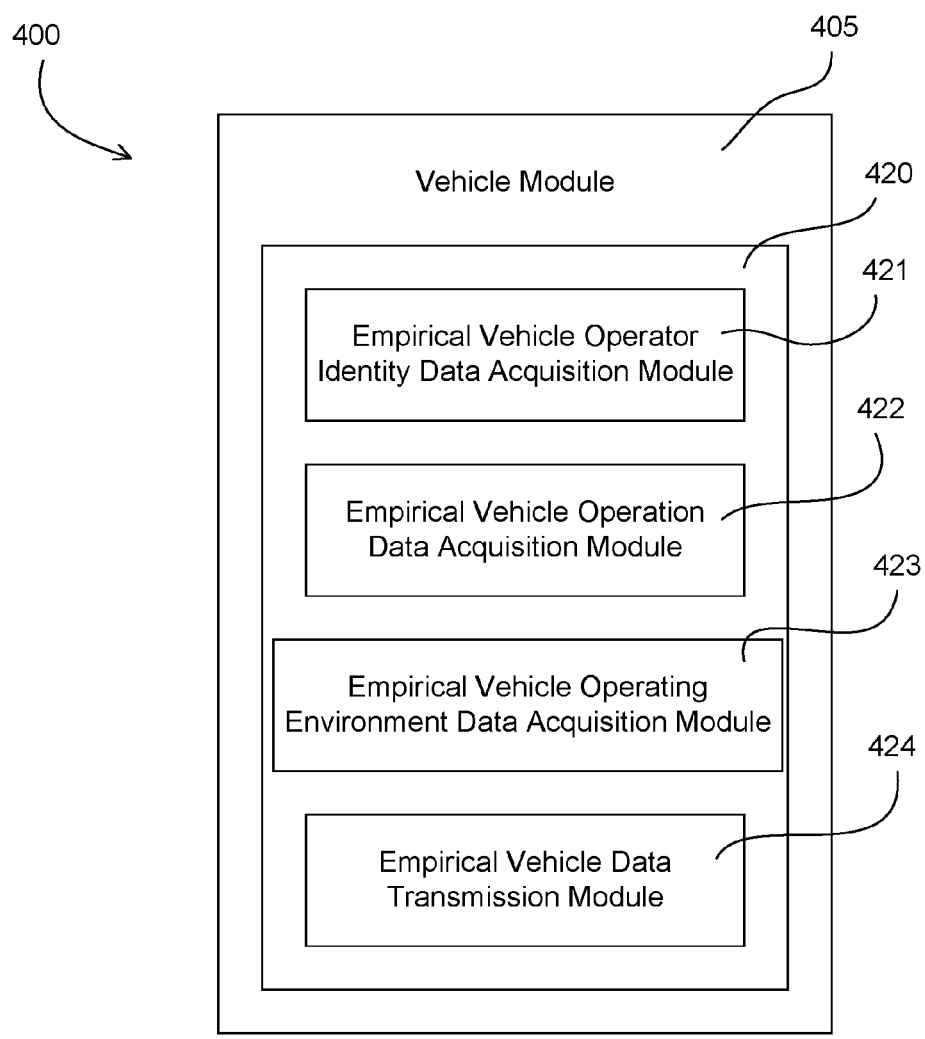
FIG. 4 illustrates a block diagram of an exemplary vehicle module for use in generating and transmitting empirical vehicle operator identity data and empirical vehicle operation data.
Figure 5:
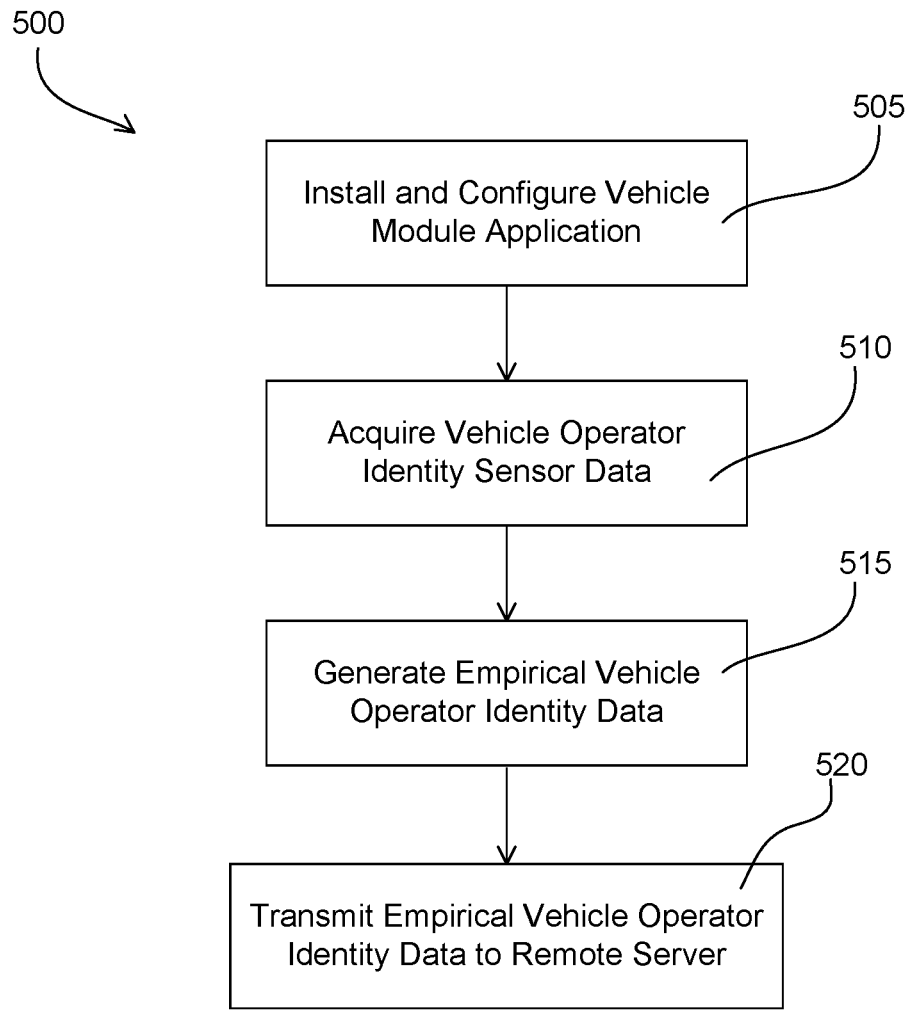
FIG. 5 depicts a flow diagram of an example method of generating and transmitting empirical vehicle operator identity data.

Turning to FIGS. 4 and 5, a vehicle module 405 of a vehicle insurance policy data generation system 400 is depicted along with a method of generating empirical vehicle operator identity data on the vehicle module 405 and, or transmitting the empirical vehicle operator identity data to a remote server 110. The vehicle module 405 may be similar to the vehicle module 121 of FIG. 1. The method 500 may be implemented by executing the modules 421, 424 on a processor (e.g., processor 115).

In any event, the vehicle module 405 may include an empirical vehicle operator identity data acquisition module 421 and an empirical vehicle related data transmission module 424 stored on a memory 420. The processor 115 may store a vehicle insurance application module on a memory (e.g., memory 420) of the vehicle module 405 and the vehicle insurance application module may be configured (block 505). The processor 115 may execute the empirical vehicle operator identity data acquisition module 421 and cause the processor 115 to acquire vehicle operator identity sensor data from at least one vehicle sensor (block 510). The processor 115 may further execute the empirical vehicle operator identity data acquisition module 421 and cause the processor 115 to generate real-time vehicle operator identity data (block 510). The processor 115 may further execute the empirical vehicle operator identity data acquisition module 421 and cause the processor 115 to receive known vehicle operator identity data (block 510). The processor 115 may further execute the empirical vehicle operator identity data acquisition module 421 and cause the processor 115 to generate empirical operator identity data based on, for example, a comparison of the real-time vehicle operator identity data with the known vehicle operator identity data (block 515). The processor 115 may execute the empirical vehicle related data transmission module 424 to cause the processor 115 to transmit the empirical vehicle operator identity data to a remote server (e.g., remote server 110 of FIG. 1) (block 520).

The method of generating empirical vehicle operator identity data 500 may include using a picture and/or a video of a vehicle operator's face to identify the driver of the vehicle. For example, the method 500 may include capturing at least one image of each person who is authorized to operate a vehicle in accordance with an associated insurance policy. The images may be stored within a database (e.g., insurance related database 170 of FIG. 1) with other empirical vehicle operator identity data. A camera and/or video device (e.g., image sensor 136, 137 of FIG. 1) may be provided within an associated insured vehicle. The camera and/or video device 136, 137 may, for example, be mounted on the dashboard (e.g., dashboard 225b of FIG. 2B) or steering wheel (e.g., steering wheel 210b of FIG. 2B) of an insured vehicle. The camera and/or video device 136, 137 may be activated when a driver occupies the vehicle. A camera and/or video device 136, 137 may be activated when a driver unlocks and enters the vehicle (e.g., sits in the driver's seat). Alternatively, a camera and/or video device 136, 137 may be activated when the driver grasps the steering wheel 210b. Optionally, a camera and/or video device 13, 137 may be activated when the driver inserts the key in an ignition of the insured vehicle. An image and/or video of the vehicle operator's face may be captured. Empirical vehicle operator identity data may be generated based on the captured image or video, using, for example, image recognition technology to identify key facial characteristics. The image recognition technology may, for example, determine a physical status of the driver by comparing an image of the driver, that was captured from within the vehicle, to a series of images that had previously been stored within an associated database 170. The facial characteristics data may be used to assess a current physical status of the driver within a predetermined set of rules. Thereby, an individual may be prohibited from operating a vehicle if the driver is not authorized to drive the vehicle or an authorized driver is determined to be in a condition unsuitable for operating the vehicle. For example, a facial image of a vehicle operator may be compared against a library of known vehicle operators to determine whether the vehicle operator has permission to drive a particular vehicle. If the vehicle operator does not have permission to drive the vehicle, the system (e.g., processor 115) may prohibit operation of the vehicle. Alternatively or additionally, if the vehicle operator does not have permission to drive the vehicle because the operator is not named on an insurance policy (i.e., the operator is an undisclosed driver), the system (e.g., processor 115) may generate an audit function to audit the actual owner/policy holder or otherwise inform him or her of the unauthorized/undisclosed driver.

Further, a facial image of a vehicle operator may be used to determine if the operator is wearing their corrective lenses, if required in accordance with her driver's license. If the driver is required to wear corrective lenses and does not have them on, operation of the vehicle may be prohibited. Yet further, a facial image of a vehicle operator may be used to determine if the operator is too tired or stressed to operate the vehicle. Images of faces, even in static photos, may show key characteristics of weariness and stress. Weariness and/or stress may affect the reflexes and acuity of a vehicle operator and may impact an ability of the vehicle operator to drive the vehicle. If a vehicle operator is determined to be too stressed or tired, the operation of the vehicle may be prohibited. Furthermore, an owner of a vehicle may require authentication of an operator of his vehicle prior to the vehicle being enabled for operation. Moreover, an owner of a vehicle may require validation that an authorized driver is in a suitable condition to operate the vehicle.

Figure 6:
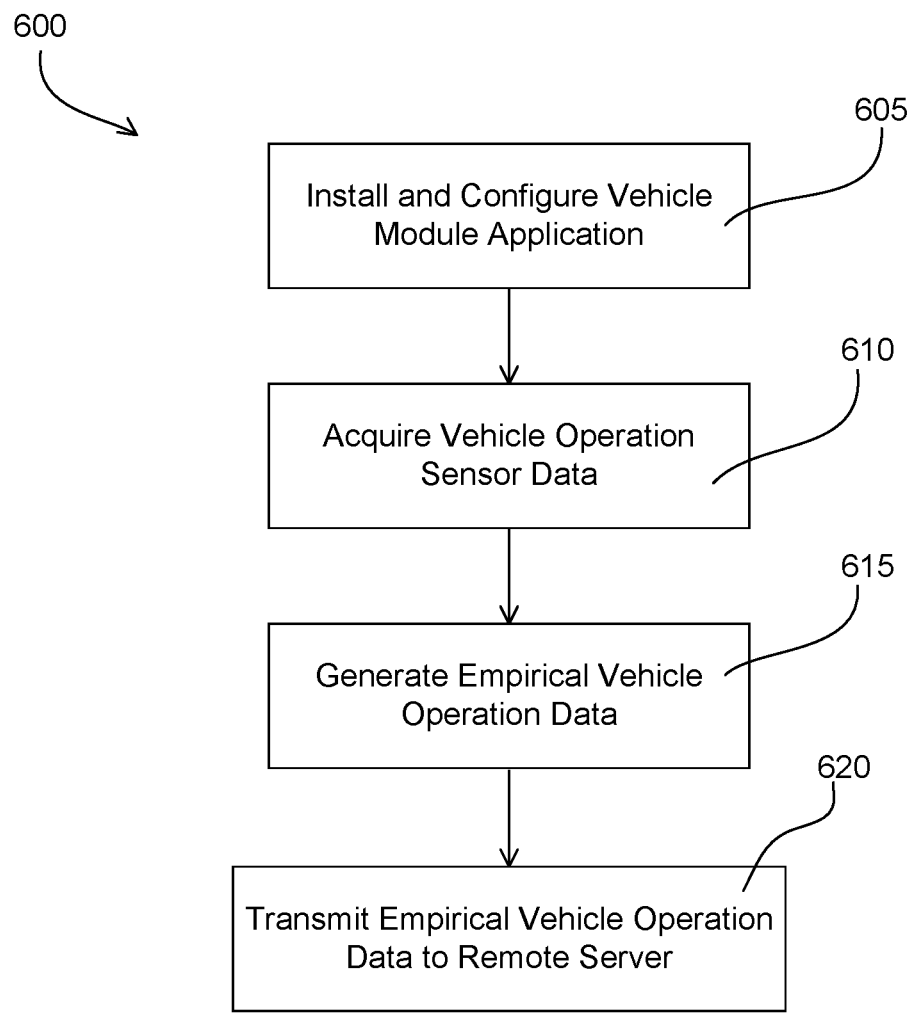
FIG. 6 depicts a flow diagram of an example method of generating and transmitting empirical vehicle operations data.

With further reference to FIG. 4, along with reference to FIG. 6, a vehicle module 405 of a vehicle insurance policy data generation system 400 is depicted along with a method of generating empirical vehicle operations data on the vehicle module 405 and, or transmitting empirical vehicle operations data to a remote server 110. The vehicle module 405 may be similar to the vehicle module 121 of FIG. 1. The method 600 may be implemented by executing the modules 422, 424 on a processor (e.g., processor 115).

In any event, the vehicle module 405 may include an empirical vehicle operation data acquisition module 422 and an empirical vehicle related data transmission module 424. The processor 115 may store a vehicle insurance application module on a memory (e.g., memory 420) of the vehicle module 405 and the vehicle insurance application module may be configured (block 605). The processor 115 may execute the empirical vehicle operation data acquisition module 422 to cause the processor 115 to receive vehicle operation sensor data (block 610). The processor 115 may further execute the empirical vehicle operation data acquisition module 422 to cause the processor 115 to generate empirical vehicle operation data based on the vehicle operation sensor data (block 615). The processor 115 may execute the empirical vehicle related data transmission module 424 to cause the processor 115 to transmit empirical vehicle operation data to a remote server (e.g., remote server 110 of FIG. 1) (block 620).

The processor 115 may execute an empirical vehicle operating environment data acquisition module 423 to cause the processor 115 to receive vehicle sensor data associated with an operating environment of the vehicle. For example, the processor 115 may generate empirical vehicle operating environment data based on data acquire from a temperature sensor, a rain sensor, an ice sensor, a snow sensor or other vehicle sensor capable of sensing an operating environment associated with the vehicle.

A method of generating empirical vehicle operation related data 600 may, for example, include detecting driving patterns. For example, vehicle operation data may be received from a vehicle telematics system (e.g., a GPS or a steering wheel angle sensor). Vehicle operation data may indicate, for example, left turn data which may be representative of a number of left turns a vehicle has navigated. One or more vehicle sensors (e.g., vibration sensors, light sensors or pressure sensors) may be installed on the exterior of the vehicle, such as on the windshield. Sensor technology (e.g., sensor technology available from Nexense ETC) may be used to monitor the length of time a vehicle is in use. Nexense's sensor technology may, for example, be used to measure sounds, movement and/or pressure within, and around, a vehicle. A pressure-sensitive sensor pad 123, 124 may be installed on a vehicle driver's seat. Data received from the vehicle driver's seat pressure sensor 123, 124 may be used to determine a length of time a driver's side seat was occupied. Alternatively, or additionally, a pressure sensor may be placed on an exterior of a vehicle (e.g., on the windshield). Data from the exterior pressure-sensitive sensor may be used, for example, to measure air flow over the vehicle as the vehicle is in motion. In another example, an audio sensor (e.g., a microphone 151, 152 of FIG. 1) may be used to monitor engine sound as the vehicle is in use. Furthermore, empirical vehicle operation data may be based on vehicle sensor data (e.g., seat occupancy sensors 123, 124, seat belt sensors 128, 129, body heat sensors 141, 142, cameras 136, 137, etc.). Empirical vehicle operation related data may, for example, be representative of circumstances where multiple passengers traveling in an insured vehicle. Multiple passengers may, for example, create a high risk for teenager vehicle operators. As discussed in detail elsewhere herein, associated insurance policy rate may be adjusted based on the empirical vehicle operation related data.

Empirical vehicle operation related data may be generated based on one or more vehicle motion sensors (e.g., vibration sensors 107, 108, pressure sensors 123, 124 and/or a light sensors 136, 137). Data from the vehicle motion sensors may be time stamped and used to determine a length of time a vehicle was in use. Empirical vehicle operation related data may be transmitted to an insurance agency. The insurance agency may determine vehicle usage based on, for example, travel time data. Travel time data may be used to determine vehicle insurance policy pricing adjustments and/or future policy payment adjustments for usage-based vehicle insurance. Updated vehicle insurance policy information may be automatically provided to an insurance customer.

Figure 7:
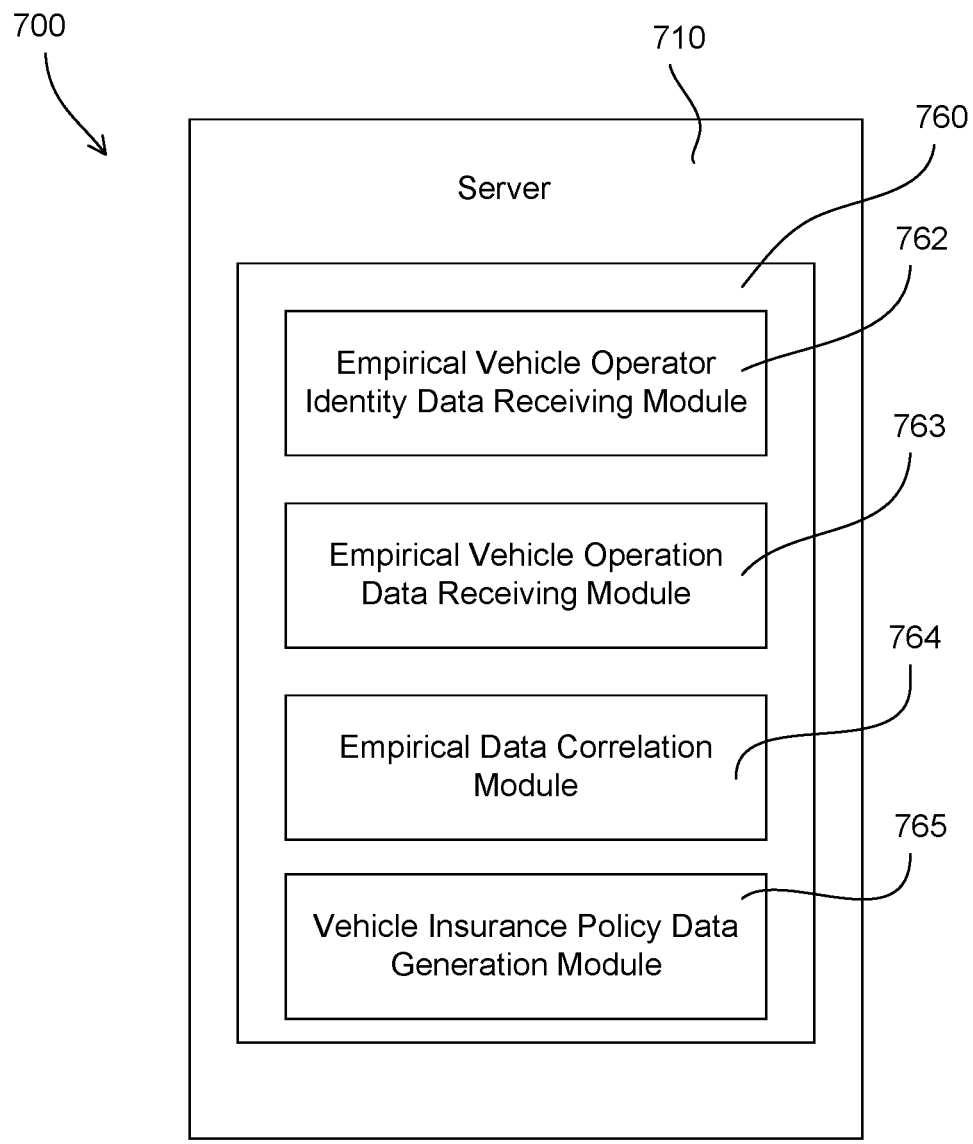
FIG. 7 illustrates a block diagram of an exemplary remote server for use in receiving empirical vehicle operator identity data and empirical vehicle operations data, and generating vehicle insurance policy data based on the empirical vehicle operator identity data and empirical vehicle operations data.
Figure 8:
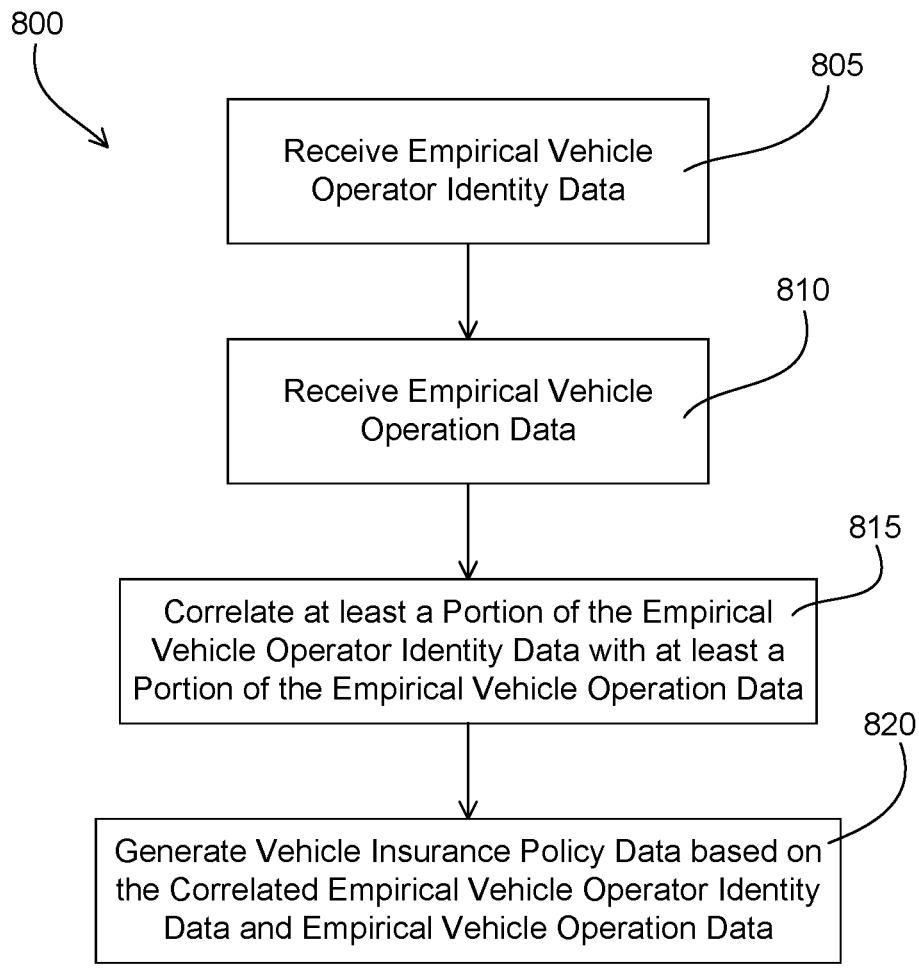
FIG. 8 depicts a flow diagram of an example method of generating vehicle insurance policy data based on empirical vehicle operator identity data and empirical vehicle operations data.

Turning to FIGS. 7 and 8, a remote server 710 of a vehicle insurance policy data generation system 600 is depicted along with a method of establishing an insurance risk related data file on the server 800. The remote server 710 may be similar to the remote server with insurance application 110 of FIG. 1. The method 800 may be implemented by executing the modules 762-765 on a processor (e.g., processor 155 of FIG. 1).

In any event, the remote server 710 may include an empirical vehicle operator identity data receiving module 762, an empirical vehicle operation data receiving module 763, a data correlation module 764 and a vehicle insurance policy data generation module 765 stored on a memory 760. The processor 155 may execute the empirical vehicle operator identity data receiving module 762 to cause the processor 155 to receive empirical vehicle operator identity data (block 805). The processor 155 may execute the empirical vehicle operation data receiving module 763 to cause the processor 155 to receive empirical vehicle operation data (block 810). The processor 155 may execute the data correlation module 764 to cause the processor 155 to correlate at least a portion of the empirical vehicle operator identity data with at least a portion of the empirical vehicle operation data (block 815). The processor 155 may execute the vehicle insurance policy data generation module 765 to cause the processor 155 to generate vehicle insurance policy data based on the correlated empirical vehicle operator identity data and empirical vehicle operation data (block 820). Alternatively, the processor 155 may execute the vehicle insurance policy data generation module 765 to cause the processor 155 to generate vehicle insurance policy data based on the empirical vehicle operator identity data and the empirical vehicle operation data (block 820).

As a particular example of the generated insurance policy data, an insurance policy may include a principle vehicle operator (e.g., person A having 0 recorded accidents). The principal vehicle operator may weigh 125 lbs. A weight sensor 123, 124, positioned within a driver's seat of an associated insured vehicle, may generate empirical vehicle operator identity data that indicates a person weighing 250 lbs. has operated the vehicle. For example, the empirical vehicle operator identity data may indicate that a vehicle operator (e.g., person B having 10 recorded accidents) has driven the insured vehicle most of the time. Alternatively, or additionally, data acquired from a facial recognition device (e.g., a camera/image processor 136, 137) may be used to generate empirical vehicle operator identity data. The processor 155 may generate vehicle insurance policy data based on the empirical vehicle operator identity data. The processor 155 may transmit the vehicle insurance policy related data to an insurance underwriting agent for use in calculating a vehicle insurance rate. An insurance policy may be adjusted based on the vehicle insurance policy related data. For example, person B may be assigned as principle operator. Alternatively, the insurance policy may be adjusted based on a combination of person A and person B. For example, a discount may be determined when a teenager drives solo 90% of the time. Alternatively, a vehicle insurance rate may be increased when a teenager drives solo only 20% of the time. The processor 155 may generate vehicle insurance policy data based on empirical vehicle operator identity data when underwriting household composite vehicle insurance policies. The processor 155 may time stamp the empirical vehicle operator identity data. Thereby, the processor 155 may determine an amount of time that a vehicle has been driven by a particular individual based on the time-stamped empirical vehicle operator identity data.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implemented method for automatically generating insurance policy related data, the method comprising:

identifying, by the one or more processors associated with a server, a vehicle operator using vehicle operator identity data that is based partially upon vehicle sensor data, the vehicle operator identity data identifying one or more physical aspects of the vehicle operator and including an image of the vehicle operator;

changing, by one more processors associated with a vehicle module installed in a vehicle:

a state of the vehicle to (i) prevent the vehicle operator from operating the vehicle when the determined identity of the vehicle operator does not match a vehicle operator who is insured to operate the vehicle, or (ii) allow the vehicle operator to operate the vehicle when the determined identity of the vehicle operator matches a vehicle operator who is insured to operate the vehicle;

receiving, by the one or more processors associated with the server, vehicle operation data that is based partially upon the vehicle sensor data and is representative of operation of the vehicle by the vehicle operator who is allowed to operate the vehicle; and calculating, by the one or more processors associated with the server, comprehensive vehicle insurance policy related data based upon a correlation between the vehicle operation data, the vehicle operator identity data, and the vehicle operator such that the comprehensive vehicle insurance policy related data indicates (i) driving habits of the vehicle operator who is allowed to operate the vehicle, and (ii) a proportion of driving time in which the vehicle operator was accompanied by one or more passengers when driving the vehicle.

2. The method of claim 1, wherein the act of changing the state of the vehicle to allow the vehicle operator to operate the vehicle comprises:
   changing the state of the vehicle to allow the vehicle operator to operate the vehicle when the vehicle operator matches a vehicle operator that is insured to operate the vehicle based upon a comparison of the vehicle operator identity data to known vehicle operator identity data.

3. The method of claim 2, wherein the known vehicle operator identity data is representative of (i) one or more identifiable physical aspects of vehicle operators that are insured to operate the vehicle, and (ii) images of the vehicle operators that are insured to operate the vehicle.

4. The method of claim 1, wherein the act of changing the state of the vehicle to prevent the vehicle operator from operating the vehicle comprises:
   identifying facial characteristics of the vehicle operator to assess a physical status of the vehicle operator in accordance with a predetermined set of rules; and
   changing the state of the vehicle to prevent the vehicle operator from operating the vehicle when the vehicle operator is determined to be in a condition unsuitable for operating the vehicle based upon the physical status of the vehicle operator.

5. The method of claim 1, wherein the act of calculating the comprehensive vehicle insurance policy related data comprises:
   calculating one or more insurance options including underwriting and pricing.

6. The method of claim 1, wherein the vehicle sensor data is received from at least one vehicle sensor including one or more of:
   a light sensor;
   a pressure sensor;
   a seat belt sensor;
   a seat occupancy sensor;
   an image sensor;
   a vehicle telematics system sensor;
   a steering wheel angle sensor;
   a vibration sensor;
   a vehicle pitch sensor;
   facial recognition sensor;
   fingerprint sensor;
   eye scan sensor;
   a vehicle yaw sensor;
   a vehicle speed sensor;
   a vehicle brake sensor;
   a steering wheel hand sensor;
   an air bag sensor;
   a microphone;
   an ultrasonic sensor; and
   an infrared sensor.

7. A system for automatically generating vehicle insurance policy related data, the system comprising:
   a server configured to:
      identify a vehicle operator using vehicle operator identity data that is based partially upon vehicle sensor data, the vehicle operator identity data identifying one or more physical aspects of the vehicle operator and including an image of the vehicle operator; and
   a vehicle module configured to:
      change a state of the vehicle to prevent the vehicle operator from operating the vehicle when the determined identity of the vehicle operator does not match a vehicle operator who is insured to operate the vehicle, or
      change a state of the vehicle to allow the vehicle operator to operate the vehicle when the determined identity of the vehicle operator matches a vehicle operator who is insured to operate the vehicle, and
   wherein the server is further configured to:
      receive vehicle operation data that is based partially upon the vehicle sensor data and is representative of operation of the vehicle by the vehicle operator who is allowed to operate the vehicle; and
      calculate comprehensive vehicle insurance policy related data based upon a correlation between the vehicle operation data, the vehicle operator identity data, and the vehicle operator such that the comprehensive vehicle insurance policy related data indicates (i) driving habits of the vehicle operator who is allowed to operate the vehicle, and (ii) a proportion of driving time in which the vehicle operator was accompanied by one or more passengers when driving the vehicle.

8. The system of claim 7, wherein:
   the vehicle module is further configured to change the state of the vehicle to allow the vehicle operator to operate the vehicle when the vehicle operator matches a vehicle operator that is insured to operate the vehicle based upon a comparison of the vehicle operator identity data to known vehicle operator identity data; and
   the known vehicle operator identity data is representative of (i) one or more identifiable physical aspects of vehicle operators that are insured to operate the vehicle, and (ii) images of the vehicle operators that are insured to operate the vehicle.

9. The system of claim 8, wherein the server is further configured to calculate the comprehensive vehicle insurance policy related data by calculating one or more insurance options including underwriting and pricing.

10. The system of claim 8, wherein the vehicle sensor data is received from at least one vehicle sensor including one or more of:
    a light sensor;
    a pressure sensor;
    a seat belt sensor;
    a seat occupancy sensor;
    an image sensor;
    a vehicle telematics system sensor;
    a steering wheel angle sensor;
    a vibration sensor;
    a vehicle pitch sensor;
    facial recognition sensor;
    fingerprint sensor;
    eye scan sensor;
    a vehicle yaw sensor;
    a vehicle speed sensor;
    a vehicle brake sensor;
    a steering wheel hand sensor;
    an air bag sensor;
    a microphone;
    an ultrasonic sensor; and
    an infrared sensor.

11. The system of claim 7, wherein the vehicle module is further configured to change the state of the vehicle to prevent the vehicle operator from operating the vehicle when identified facial characteristics of the vehicle operator used to assess a physical status of the vehicle operator in accordance with a predetermined set of rules indicate that the vehicle operator is in a condition unsuitable for operating the vehicle.

12. A non-transitory, tangible, computer-readable medium storing instructions that, when executed by a processor, cause the processor to:
    identify a vehicle operator using vehicle operator identity data that is based partially upon vehicle sensor data, the vehicle operator identity data identifying one or more physical aspects of the vehicle operator and including an image of the vehicle operator;
    change a state of the vehicle to prevent the vehicle operator from operating the vehicle when the determined identity of the vehicle operator does not match a vehicle operator who is insured to operate the vehicle, or
    change a state of the vehicle to allow the vehicle operator to operate the vehicle when the determined identity of the vehicle operator matches a vehicle operator who is insured to operate the vehicle;
        receive vehicle operation data that is based partially upon the vehicle sensor data and is representative of operation of the vehicle by the vehicle operator who is allowed to operate the vehicle; and
        calculate comprehensive vehicle insurance policy related data based upon a correlation between the vehicle operation data, the vehicle operator identity data, and the vehicle operator such that the comprehensive vehicle insurance policy related data indicates (i) driving habits of the vehicle operator who is allowed to operate the vehicle, and (ii) a proportion of driving time in which the vehicle operator was accompanied by one or more passengers when driving the vehicle.

13. The non-transitory, tangible, computer-readable medium of claim 12, wherein the instructions to change the state of the vehicle to allow the vehicle operator to operate the vehicle further include instructions that, when executed by the processor, cause the processor to change the state of the vehicle to allow the vehicle operator to operate the vehicle when the vehicle operator matches a vehicle operator that is insured to operate the vehicle based upon a comparison of the vehicle operator identity data to known vehicle operator identity data.

14. The non-transitory, tangible, computer-readable medium of claim 13, wherein the known vehicle operator identity data is representative of (i) one or more identifiable physical aspects of vehicle operators that are insured to operate the vehicle, and (ii) images of the vehicle operators that are insured to operate the vehicle.

15. The non-transitory, tangible, computer-readable medium of claim 12, wherein the instructions change the state of the vehicle to prevent the vehicle operator from operating the vehicle further include instructions that, when executed by the processor, cause the processor to change the state of the vehicle to prevent the vehicle operator from operating the vehicle when identified facial characteristics of the vehicle operator used to assess a physical status of the vehicle operator in accordance with a predetermined set of rules indicate that the vehicle operator is in a condition unsuitable for operating the vehicle.

16. The non-transitory, tangible, computer-readable medium of claim 12, wherein the instructions to calculate the comprehensive vehicle insurance policy related data further include instructions that, when executed by the processor, cause the processor to calculate one or more insurance options including underwriting and pricing.

17. The non-transitory, tangible, computer-readable medium of claim 12, wherein the vehicle sensor data is received from at least one vehicle sensor including one or more of:
    a light sensor;
    a pressure sensor;
    a seat belt sensor;
    a seat occupancy sensor;
    an image sensor;
    a vehicle telematics system sensor;
    a steering wheel angle sensor;
    a vibration sensor;
    a vehicle pitch sensor;
    facial recognition sensor;
    fingerprint sensor;
    eye scan sensor;
    a vehicle yaw sensor;
    a vehicle speed sensor;
    a vehicle brake sensor;
    a steering wheel hand sensor;
    an air bag sensor;
    a microphone;
    an ultrasonic sensor; and
    an infrared sensor.

* * * * *